Aug. 22, 1933.  W. P. HUNT ET AL  1,923,440

WORKTABLE FOR DRILL PRESSES

Filed June 30, 1930   2 Sheets-Sheet 1

Inventor
Wilson P. Hunt and
Rudolph E. Herrstrum
By Walter N. Haskell.
his Attorney

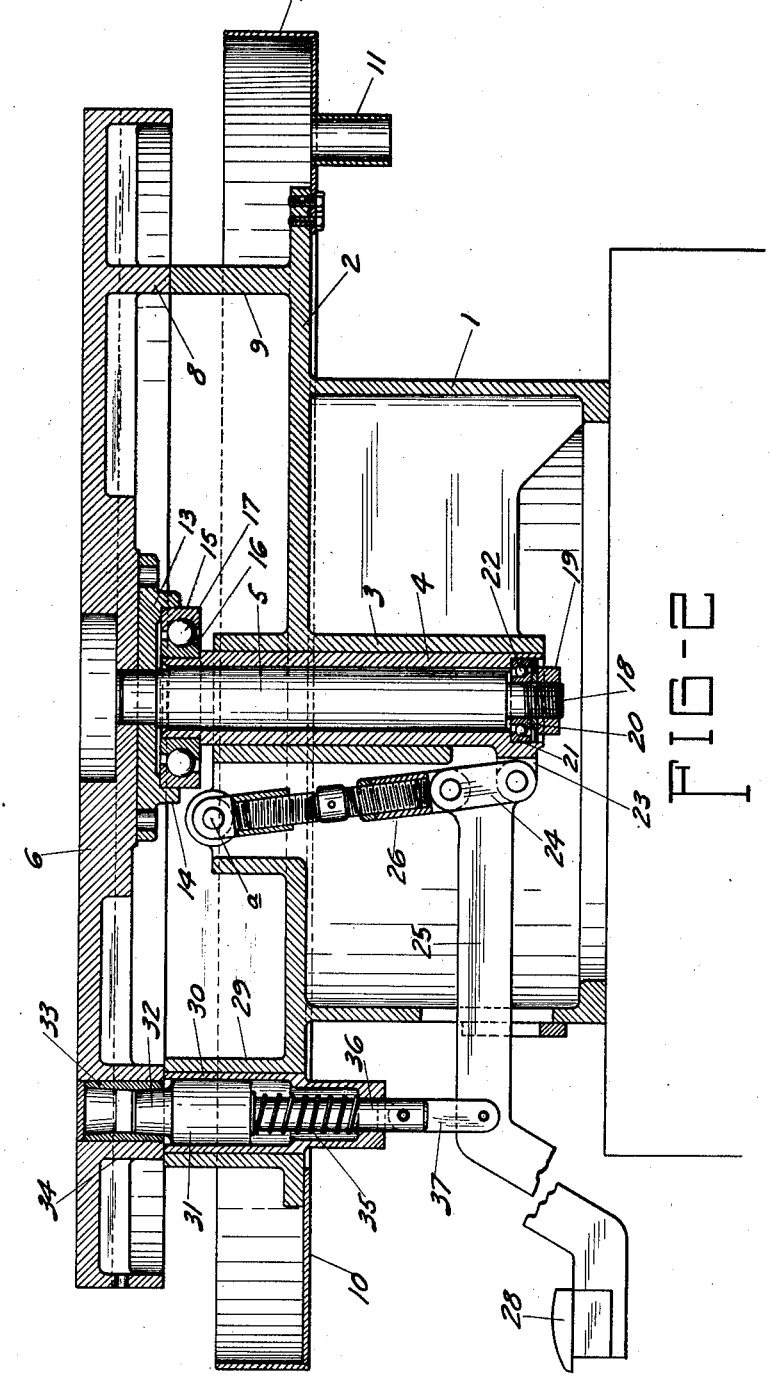

Patented Aug. 22, 1933

1,923,440

UNITED STATES PATENT OFFICE 1,923,440

WORKTABLE FOR DRILL PRESSES

Wilson P. Hunt and Rudolph E. Herrstrum, Moline, Ill., assignors to Moline Tool Company, Moline, Ill.

Application June 30, 1930. Serial No. 464,957

3 Claims. (Cl. 77—63)

Our invention has reference to a work table for drill presses or the like, and pertains more specially to that kind of such devices which are designed for use with heavy work, and which are rotatable so as to bring different parts of the work into position for drilling or other operation.

One of the purposes of the present invention is to support the table so that it will be easy to rotate, and so that it can be conveniently shifted from a rigidly held position into a position for rotation or the reverse. The return movement is assisted by stored power devices which receive an increased tension in the original movement to free the table.

Another purpose thereof is to provide means for locking the table from movement at such times as work is being performed thereon, which locking means is automatically released coincidently with the movement of the table into a position to be rotated.

The above named, and other features and advantages of the invention will be more fully understood from the following specification, reference being had to the accompanying drawings, in which;

Fig. 2 is a vertical medial section thereof with the table in a non-rotatable position.

Figure 1:
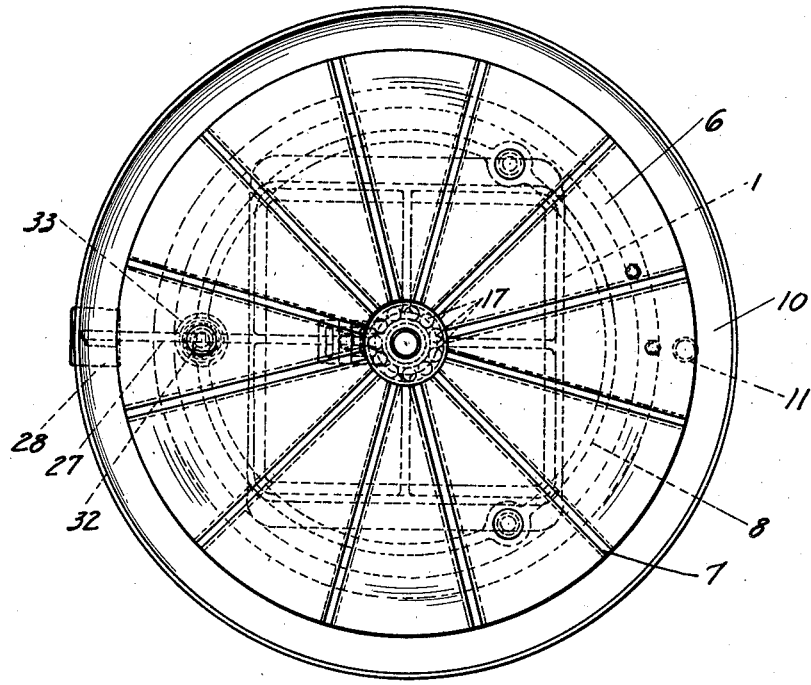
Fig. 1 is a plan view of the table.

The reference number 1 indicates a circular base, upon which is mounted a frame 2, supported centrally of which is a hollow column 3, within which is slidably held a tubular support 4. Rotatably positioned in the support 4 is a shaft 5, upon the upper end of which is centered a circular table 6, provided in its upper face with radial channels 7 for the usual positioning of tools for holding a piece of work in place on the table. Beneath the table is an annular rib 8, supported when the machine is in operation upon a similar rib 9 projected upwardly from the frame. Beneath the table is supported an oil pan 10, provided at one side with a drip pipe 11.

Below the center of the table 6 is a cap-plate 13, having an annular flange 14 with which is connected the outer ring 15 of a ball bearing unit, the inner ring 16 being fixed to the upper end of the tabular support 4, said rings having complementary ball races on their adjacent faces to receive a series of balls 17. When the table 6 is raised for rotation the weight of the table and of the piece of work thereon is supported by said ball-bearing unit. The shaft 5 has a reduced lower end 18, threaded to receive a nut 19, and above said nut is a relatively small ball-bearing organism, comprising a ring 20 rotatable with the shaft 5, a ball ring 21, stationary with the support 4, and a series of balls 22 in play between said rings. Said last named ball-bearing organism assists in steadying the shaft 5 in its rotation.

From the lower end of the support 4 is projected a pair of ears 23, between which is pivoted the cross-head 24 of a foot-lever 25, the other end of which cross-head has a pivotal connection with the lower end of a turn-buckle 26, the upper end of which is pivoted to the frame as at $a$. The foot-lever 25 projects outwardly beyond the edge of the table 6, and is provided at its outer end with a pedal 28.

In that side of the frame 2 which is above the lever 25 is a cylindrical casing 29, within which is a housing 30, containing a plunger 31, slidable therein. At the upper end of the plunger 31 is a detent 32 for engagement with a bushing 33 in an enlargement 34 of the rib 9, such engagement being yieldably maintained by means of a coiled spring 35 in the lower end of the housing 30. The plunger is also provided with a stem 36 passing downwardly through the spring 35 and through an opening in the lower end of the housing, the lower end of said stem being connected by a link 37 with the foot-lever 25.

Figure 3:
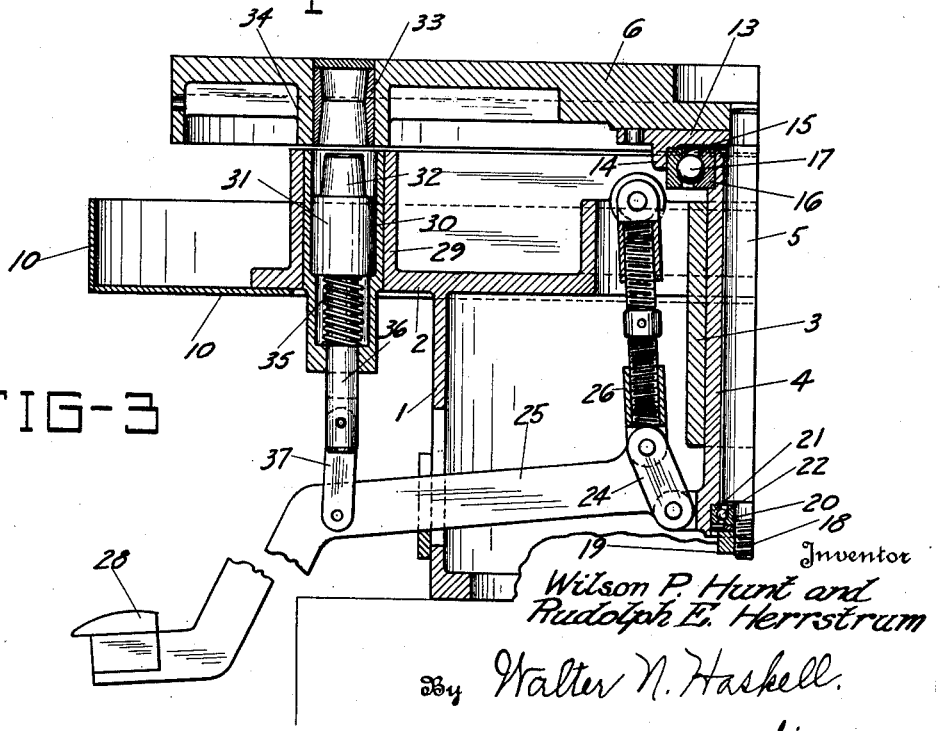
Fig. 3 is a fragmentary sectional view similar to the showing in Fig. 2, with the table in raised position.

Upon the foot-lever 25 being depressed by pressure of the foot of the operator on the pedal 28 the plunger 31 is drawn downwardly, releasing the detent 32 and compressing the spring 36. The parts 24 and 26 form a toggle-joint, and the movement of the lever 25 downwardly causes said joint to break outwardly, as shown in Fig. 3. This tends to lessen the distance between the ends of the toggle-joint, and has the effect of moving upwardly the lower end of the part 24, and with it the tubular support 4 and shaft 5, causing a slight spacing between the table 6 and frame 1. The table is then free to be turned to any new position, the table and its load being easy of rotation by reason of the anti-friction devices associated with its pivot.

As many of the bushings 33 may be provided as may be desired, to serve as keepers for the detent 32, three of such bushings being indicated in the drawings, at equi-distant points.

When the position of the table has been shifted as mentioned, and the pressure removed from the foot-lever, the detent 32 is again engaged with one of the bushings 30 by the force of the spring 35, which also holds the same against accidental release. The power possessed by said spring also assist in moving the foot-lever 25 upwardly again and restoring the toggle-joint to its original position. The weight of the table 6 and load thereon also aids in returning the parts to their normal positions. By means of the turnbuckle 26 the length of the toggle-joint can be increased or diminished, as desired.

The location of the spring 35 beneath the plunger 31 is a matter of convenience in the construction of the machine, and such spring can be otherwise positioned to produce the desired result, or other types of springs can be substituted therefor. Other changes in the form and arrangement of various parts of the machine can also be made, without departing from the scope of the invention, as set forth herein.

What we claim, and desire to secure by Letters Patent, is:

1. A machine of the class described, comprising a frame, a support vertically movable in said frame, a table rotatably mounted on said support and provided with a keeper for a detent, a toggle-joint connection between said frame and said support, a lever connected with said toggle-joint for the operation thereof, and a detent supported in said frame, engageable with said keeper, and operatively connected with said lever.

2. A machine of the class described, comprising a frame, a support vertically movable therein, a table rotatably mounted on said support and provided with a plurality of keepers for a locking element, a toggle-joint connection between said frame and said support, a lever connected with said toggle-joint for the operation thereof, and a spring-pressed locking element in said frame, adapted for selective engagement with said keepers, and operatively connected with said lever.

3. A machine of the class described, comprising a frame, a support vertically movable in said frame, a work table rotatably mounted on said support, and normally resting on said frame, a toggle-joint connection between said frame and said support, a foot-lever connected with said toggle-joint, a plunger in said frame provided with a detent, one or more keepers therefor in said table, a tension spring controlling the action of said plunger, and a connection between said plunger and said lever, the movement of said lever simultaneously withdrawing said detent from engagement with its keeper and actuating said toggle-joint to raise said table.

WILSON P. HUNT.
RUDOLPH E. HERRSTRUM.